(12) United States Patent
Takabe

(10) Patent No.: US 10,298,089 B2
(45) Date of Patent: May 21, 2019

(54) ELECTRIC COMPRESSOR

(71) Applicant: SANDEN HOLDINGS CORPORATION, Isesaki-shi (JP)

(72) Inventor: Tetsuya Takabe, Isesaki (JP)

(73) Assignee: SANDEN HOLDINGS CORPORATION, Gunma (JP)

( * ) Notice: Subject to any disclaimer, the term of this patent is extended or adjusted under 35 U.S.C. 154(b) by 271 days.

(21) Appl. No.: 15/321,553

(22) PCT Filed: Mar. 17, 2015

(86) PCT No.: PCT/JP2015/057787
§ 371 (c)(1),
(2) Date: Dec. 22, 2016

(87) PCT Pub. No.: WO2015/198650
PCT Pub. Date: Dec. 30, 2015

(65) Prior Publication Data
US 2017/0207677 A1 Jul. 20, 2017

(30) Foreign Application Priority Data
Jun. 27, 2014 (JP) .................................. 2014-132720

(51) Int. Cl.
*H02K 5/24* (2006.01)
*H02K 7/14* (2006.01)
(Continued)

(52) U.S. Cl.
CPC .............. *H02K 5/24* (2013.01); *F04B 35/04* (2013.01); *F04B 39/121* (2013.01);
(Continued)

(58) Field of Classification Search
CPC ............ H02K 5/24; H02K 5/22; H02K 1/185; H02K 7/14; H02K 2213/03; H02K 1/18;
(Continued)

(56) References Cited

U.S. PATENT DOCUMENTS 6,181,038 B1 * 1/2001 Van Rooij .............. H02K 1/185
310/216.137
6,348,753 B1 * 2/2002 Sakai ..................... H02K 1/148
310/191

(Continued)

FOREIGN PATENT DOCUMENTS

CN 101600894 12/2009
JP 9-287585 11/1997
(Continued)

OTHER PUBLICATIONS

Office Action dated Mar. 13, 2018 which issued in the corresponding Japanese Patent Application No. 2014-132720.
(Continued)

*Primary Examiner* — Jue Zhang
(74) *Attorney, Agent, or Firm* — Cozen O'Connor

(57) ABSTRACT

In order to ensure shrink-fitted components, such as a casing, to have a desirable force for holding a stator while maintaining a desirable durability, an electric compressor in which the stator is fixed to the casing by shrink fitting is configured as follows. Three protrusions 41*f* are provided protruding radially inside from the peripheral wall of a first casing 41 so as to be spaced apart from each other in the circumferential direction, and each protrusion 41*f* is provided with a groove 41*f*2 which extends in the axial direction in a circumferentially central portion of the protrusion 41*f*. Protruding end surfaces 41*f*1 of the protrusions 41*f* are fixed to the outer periphery of the stator 3 by shrink fitting at contact interfaces therebetween.

3 Claims, 6 Drawing Sheets

(51) Int. Cl.
    *F04C 18/02* (2006.01)
    *F04C 29/00* (2006.01)
    *H02K 5/22* (2006.01)
    *F04B 35/04* (2006.01)
    *F04B 39/12* (2006.01)
    *H02K 1/18* (2006.01)
(52) U.S. Cl.
    CPC ...... *F04C 18/0215* (2013.01); *F04C 29/0085* (2013.01); *H02K 1/185* (2013.01); *H02K 5/22* (2013.01); *H02K 7/14* (2013.01); *F04C 2210/26* (2013.01); *F04C 2230/60* (2013.01); *F04C 2240/30* (2013.01); *F04C 2240/40* (2013.01); *H02K 2213/03* (2013.01)
(58) Field of Classification Search
    CPC ........ F04B 35/04; F04B 39/121; F04B 39/12; F04C 18/0215; F04C 29/0085; F04C 2210/26; F04C 2230/60; F04C 2240/30; F04C 2240/40; F04C 2213/03
    USPC .......................................................... 310/89
    See application file for complete search history.

(56) References Cited

U.S. PATENT DOCUMENTS

| | | | |
|---|---|---|---|
| 2001/0038797 A1 | 11/2001 | Makino et al. | |
| 2004/0021393 A1* | 2/2004 | Suzuki | H02K 1/148 310/216.012 |
| 2004/0124731 A1* | 7/2004 | Kimura | F04C 23/008 310/216.044 |
| 2005/0115055 A1* | 6/2005 | Kimura | F01C 21/10 29/596 |
| 2007/0210669 A1* | 9/2007 | Fukasaku | H02K 1/185 310/216.023 |

FOREIGN PATENT DOCUMENTS

| | | | | |
|---|---|---|---|---|
| JP | 11-13654 | | 1/1999 | |
| JP | 2001-289173 | | 10/2001 | |
| JP | 2007-244150 | | 9/2007 | |
| JP | 2007244150 A | * | 9/2007 | ............ H02K 1/185 |
| JP | 2007-282309 | | 10/2007 | |
| JP | 2008-048466 | | 2/2008 | |
| JP | 2011-196212 | | 10/2011 | |
| JP | 2012-090495 | | 5/2012 | |
| JP | 2014-75971 | | 4/2014 | |
| JP | 2014075971 A | * | 4/2014 | ............... H02K 1/27 |

OTHER PUBLICATIONS

Office Action dated Jan. 10, 2018 which issued in the corresponding Chinese Patent Application No. 201580033389.2.
Office Action dated Oct. 8, 2018 which issued in the corresponding Chinese Patent Application No. 201580033389.2.

* cited by examiner

DEFORMED SHAPE OF STATOR (8 POLES, 12 SLOTS)

ELECTRIC COMPRESSOR

RELATED APPLICATIONS

This is a U.S. National Phase Application under 35 USC 371 of International Application PCT/JP2015/057787 filed on Mar. 17, 2015.

This application claims the priority of Japanese application no. 2014-132720 filed Jun. 27, 2014, the entire content of both of which are hereby incorporated by reference.

TECHNICAL FIELD

The present invention relates to an electric compressor which is used for compressing refrigerant in a vehicle air conditioner or the like, and which integrally includes a compression mechanism and an electric motor for driving the compression mechanism.

BACKGROUND ART

Such an electric compressor is disclosed, for example, in Patent Document 1. In the electric compressor disclosed in Patent Document 1, an electric motor and a compression mechanism are housed in a casing. The electric motor includes a rotor that has a plurality of magnetic poles, and an annular stator that is disposed radially outside the rotor and that has a plurality of slots. The compression mechanism is driven by the electric motor. A plurality of recesses are formed in the outer periphery of the stator so as to be spaced apart from each other in the circumferential direction, and the stator is fixed to the casing by shrink fitting at a plurality of portions other than the recesses.

REFERENCE DOCUMENT LIST

Patent Document

Patent Document 1: JP 2011-196212 A

SUMMARY OF THE INVENTION

Problems to be Solved by the Invention

In such an electric compressor, when an electric current is supplied to coils in the stator, a rotating magnetic field is generated to vibrate the stator. This vibration is transmitted through shrink-fitted portions to the casing to which the stator is fixed, and produces problematic noises.

To reduce such vibration transmission from the stator to the casing, the shrink-fitted area between the stator and the casing has been reduced by making the shrink-fitted area discontinuous in the circumferential direction as described above.

However, if the allowance for shrink fitting at each shrink-fitted portion is increased to ensure the sufficient force for holding the stator, an increased stress will be applied to the contact interfaces of the shrink-fitted portions, and thus shrink-fitted components, in particular the casing, will be reduced in durability.

The present invention has been made in view of such circumstances, and an object thereof is to provide an electric compressor ensuring shrink-fitted components (casing) for holding the stator by shrink fitting to have a desirable durability and a sufficient force for holding the stator.

Means for Solving the Problems

To achieve the above object, an electric compressor according to the present invention, which is driven by an electric motor and compresses refrigerant, and in which the electric motor including a rotor and a stator disposed radially outside the rotor is housed in a cylindrical casing, is configured to include a plurality of protrusions formed protruding radially inside from an inner periphery of the casing so as to be spaced apart from each other in a circumferential direction of the inner periphery, in which each of the protrusions is provided with a groove which extends in an axial direction in a circumferentially central portion of the protrusion, and the protruding end surfaces of the protrusions are fixed to an outer periphery of the stator by shrink fitting at contact interfaces therebetween.

Effects of the Invention

In the electric compressor according to the present invention, a contact pressure between each circumferential edge of the protrusions of the casing and the outer periphery of the stator is increased in the plurality of shrink-fitted portions by way of which the stator is shrink-fitted to the casing. This increases the force for holding the stator without increasing the allowance for shrink fitting, and thus ensures shrink-fitted components, such as a casing, to have a desirable force for holding the stator while maintaining a desirable durability.

MODE FOR CARRYING OUT THE INVENTION

Hereinafter, an embodiment of the present invention will be described with reference to the accompanying drawings.

Figure 1:
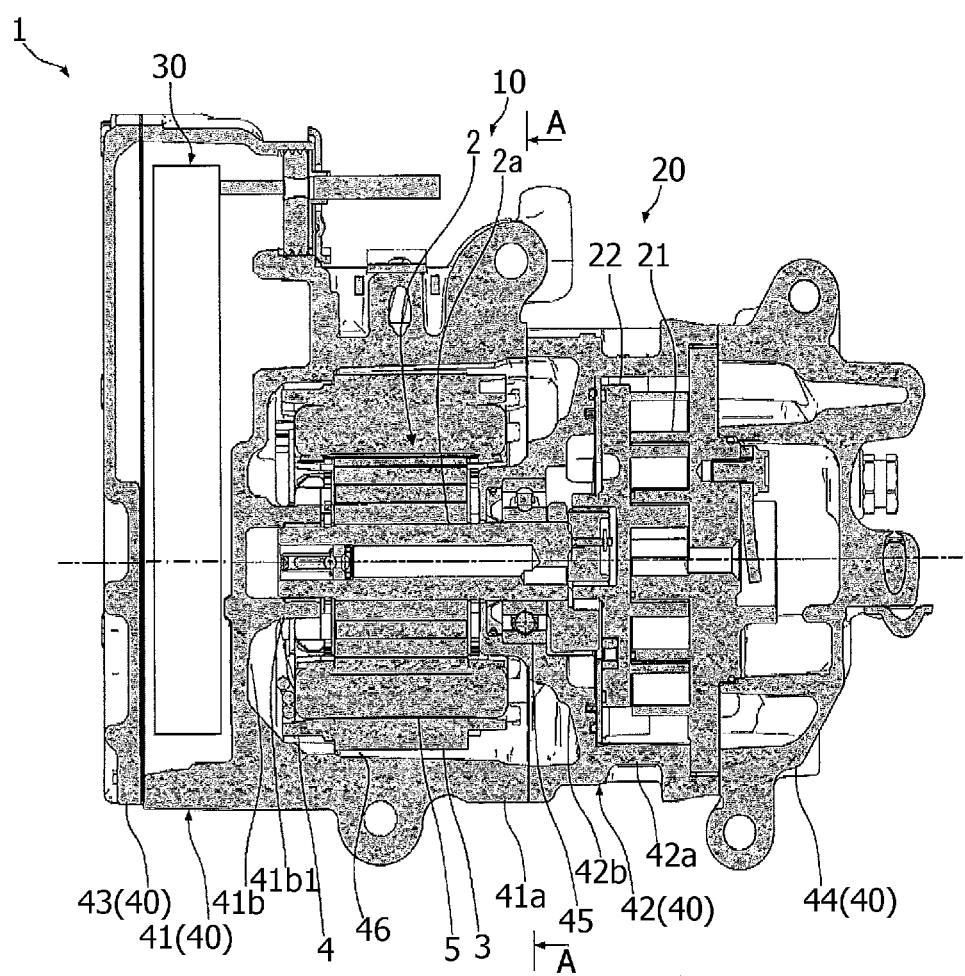
FIG. 1 is a cross-sectional view of an electric compressor according to an embodiment of the present invention.
Figure 2:
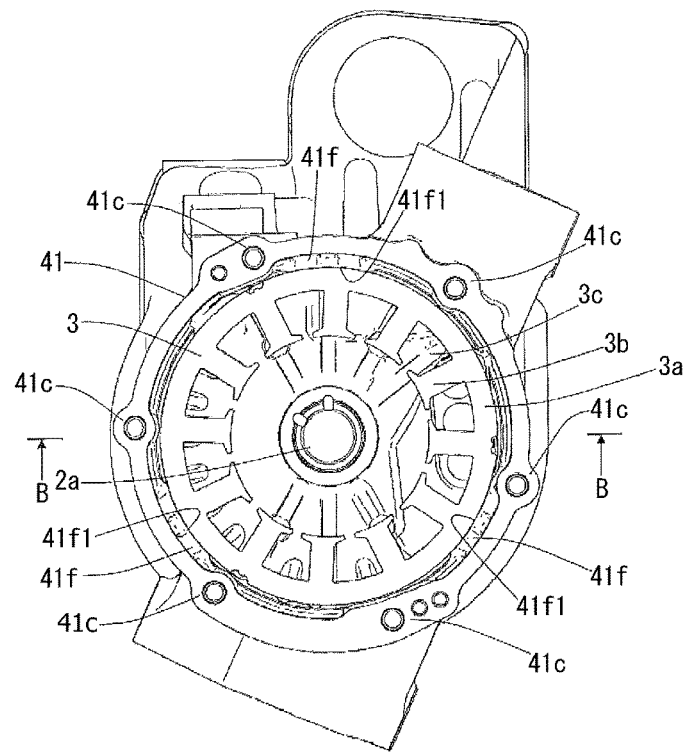
FIG. 2 is a front view of the electric compressor as viewed in the direction indicated by arrow A-A of FIG. 1.

FIG. 1 is a cross-sectional view of an electric compressor according to a first embodiment of the present invention. FIG. 2 is a front view of the electric compressor as viewed in the direction indicated by arrow A-A of FIG. 1.

An electric compressor 1 according to this embodiment is provided, for example, to a refrigerant circuit for a vehicle air conditioner, and suctions and compresses refrigerant of the vehicle air conditioner and discharges the compressed refrigerant. The electric compressor 1 includes an electric motor 10, a compression mechanism 20 driven by the electric motor 10, an inverter 30 for driving the electric motor 10, and a casing 40 which houses therein the electric motor 10, the compression mechanism 20 and the inverter 30.

In this embodiment, the electric compressor 1 is a so-called inverter-integrated compressor, and has a first casing 41, a second casing 42, an inverter cover 43, and a compression mechanism cover 44. The first casing 41 houses therein the electric motor 10 and the inverter 30, and the second casing 42 houses therein the compression mechanism 20. The casings and covers (41, 42, 43 and 44) are integrally fastened with fastening means (not shown), such as bolts, so as to constitute the casing 40 of the electric compressor 1.

The first casing 41 includes an annular peripheral wall 41a and a partition wall 41b. The partition wall 41b divides the internal space of the first casing 41 into a space for housing the electric motor 10 and a space for housing the inverter 30. The inverter 30 is housed in the first casing 41 through an opening at one end (the left-hand side of FIG. 1) of the peripheral wall 41a, and the opening is closed by the inverter cover 43. The electric motor 10 is housed in the first casing 41 through an opening at the other end (the right-hand side of FIG. 1) of the peripheral wall 41a, and the opening is closed by the second casing 42 (a bottom wall 42b which will be described later). The partition wall 41b includes, at its radially central portion, a tubular support portion 41b1 for supporting one end of a rotating shaft 2a, which will be described later, of the electric motor 10. The support portion 41b1 is provided so as to protrude toward the other end of the peripheral wall 41a.

As shown in FIG. 2, a plurality of (six) fastening portions 41c (bosses) for fastening the first casing 41 to the second casing 42 are formed on the other end of the first casing 41 so as to be spaced apart from each other in the circumferential direction of the peripheral wall 41a.

Three protrusions 41f are formed protruding from the peripheral wall of the first casing 41 so as to be spaced apart from each other in the circumferential direction. The protrusions 41f are disposed so that the circumferential angular positions thereof are different from those of the fastening portions 41c. Specifically, the protrusions 41f are formed so as to protrude radially inside from the inner periphery of the peripheral wall 41a further than, for example, the fastening portions 41c, and so as to extend in the axial direction of the first casing 41.

More specifically, as shown in FIG. 2, a protruding end surface (surface constituting the inner periphery) 41f/1 of each protrusion 41f is formed in a circular arc shape so as to conform in shape to the outer periphery of a stator 3 (a back yoke 3a, specifically) of the electric motor 10. Moreover, there is a gap between an inside diameter circle extending along these protruding end surfaces 41f/1, and the inside surfaces of the fastening portions 41c.

Figure 3:
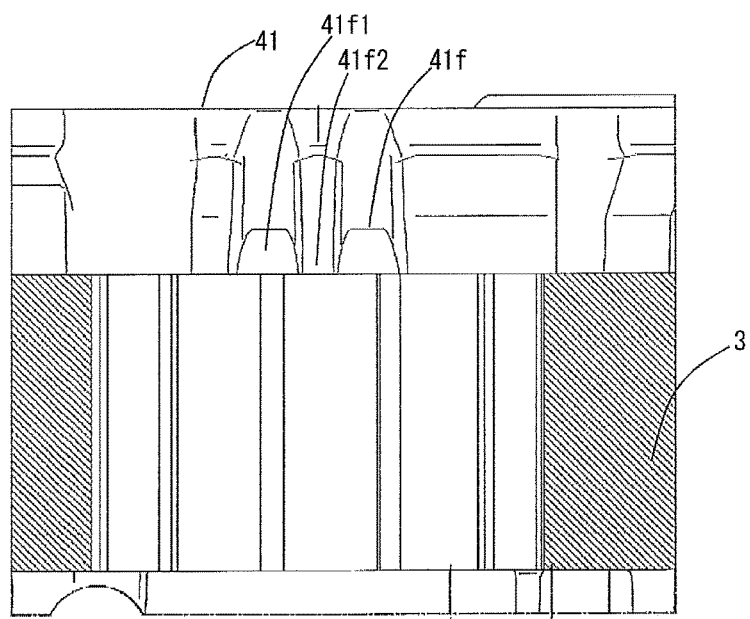
FIG. 3 is a cross-sectional view of the electric compressor as viewed in the direction indicated by arrow B-B of FIG. 2.
Figure 4:
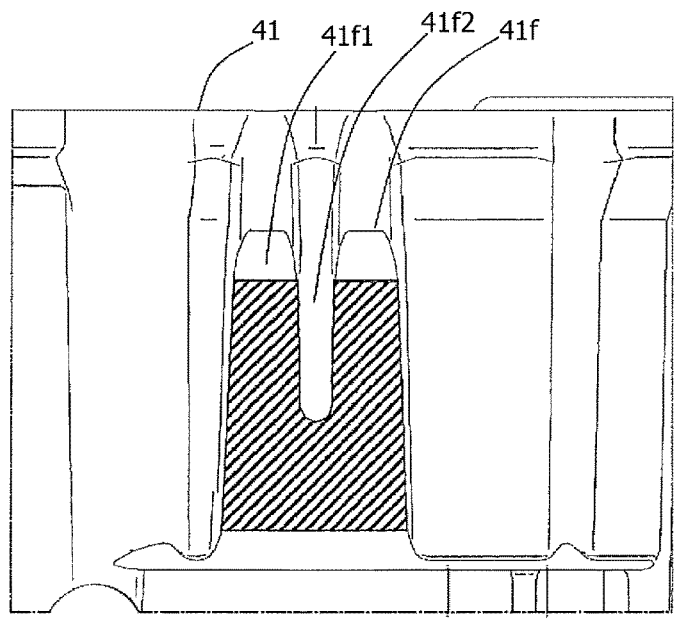
FIG. 4 is a cross-sectional view of the electric compressor in which a stator is removed from the state shown in FIG. 3 (i.e. a cross-sectional view of the first casing).
Figure 5:
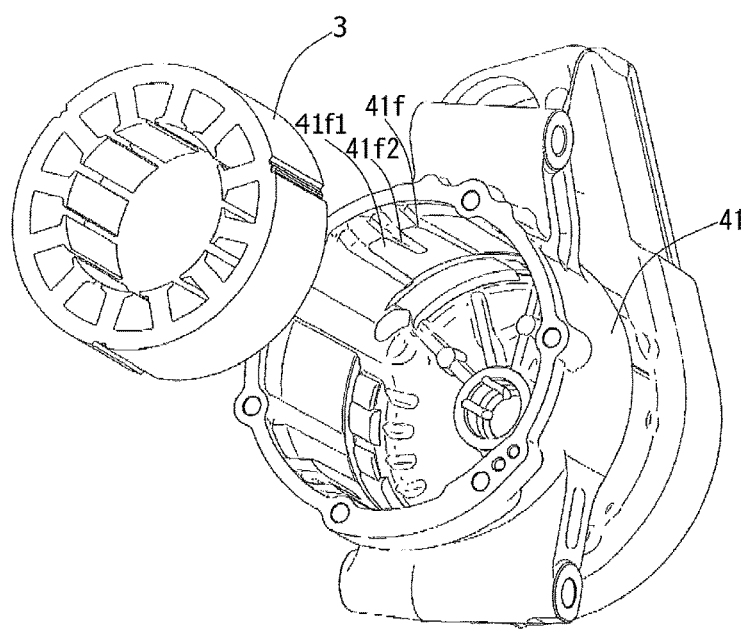
FIG. 5 is an exploded perspective view of the stator and a first casing.
Figure 6:
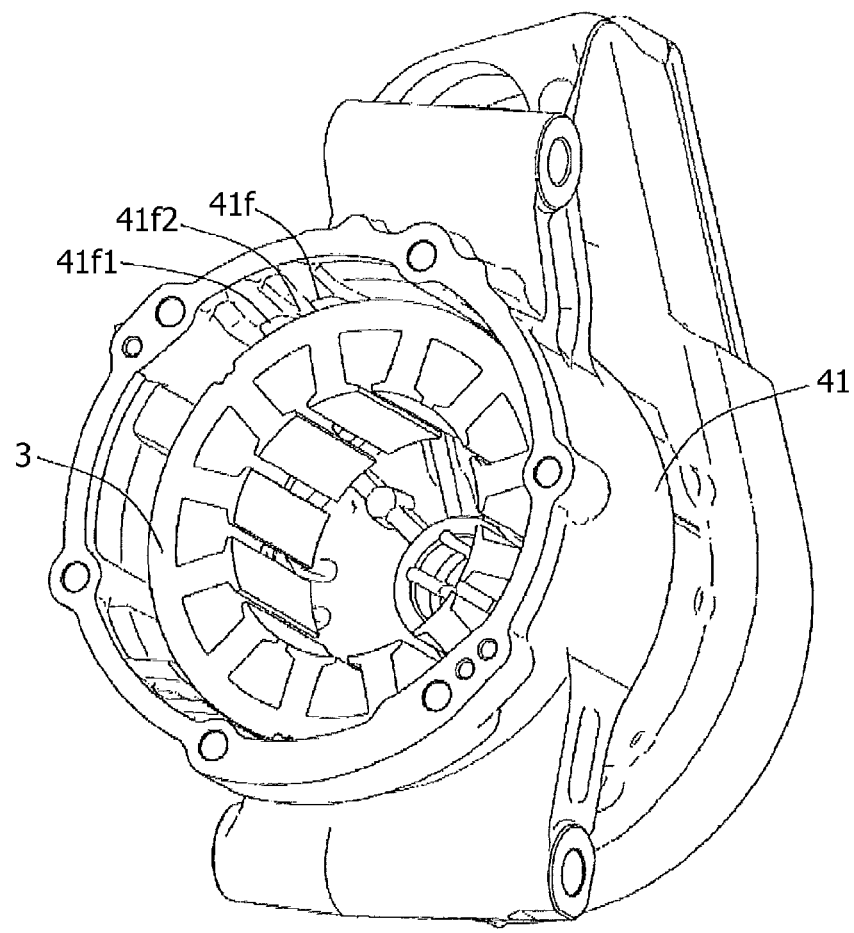
FIG. 6 is a perspective view of the stator housed in the first casing.

FIG. 3 is a cross-sectional view of the electric compressor as viewed in the direction indicated by arrow B-B of FIG. 2. FIG. 4 is a cross-sectional view of the electric compressor in which the stator is removed from the state shown in FIG. 3 (i.e. a cross-sectional view of the first casing). FIG. 5 is an exploded perspective view of the stator and the first casing. FIG. 6 is a perspective view of the stator housed in the first casing.

As shown in FIGS. 3 to 5, each protrusion 41f is provided with a groove 41f/2 which extends from one end (close to the inverter 30) toward the other end (close to the compression mechanism 20) in the axial direction in a circumferentially central portion of the protrusion 41f. The groove 41f/2 is opened at the one end but closed at the other end in the axial direction, and has a length of approximately half of the entire length of the protrusion 41f in the axial direction. Thus, the protruding end surface 41f/1 of the protrusion 41f has a U shape.

The one end of the protruding end surface 41f/1 in the axial direction, at which the one end (close to the inverter 30) of the groove 41f/2 in the axial direction is opened, is exposed without contact with the outer periphery of the stator 3. In contrast, the other end (close to the compression mechanism 20) of the protruding end surface 41f/1 in the axial direction is in contact with the outer periphery of the stator 3 (The U-shaped contact area to be shrink-fitted to the stator 3 is indicated by hatching in FIG. 4.). With an allowance for shrink fitting taken into account, the first casing 41 is formed so that its inside diameter circle, which extends along the protruding end surfaces 41f/1, has a diameter smaller than the outside diameter of the outer periphery of the stator 3 to be shrink-fitted to the first casing 41.

As described above, the stator 3 is fixed to the casing 40 (the first casing 41) by shrink fitting the protrusions 41f to the stator 3 at contact interfaces between the protruding end surfaces 41f/1 and the outer periphery of the stator 3.

The second casing 42 is fastened to the first casing 41 by way of the plurality of fastening portions 41c, which are formed on the end of the first casing 41 so as to be spaced apart from each other in the circumferential direction. For example, the second casing 42 is formed in a single open-ended tubular shape having an opening at an end opposite to the end fastened to the first casing 41. The compression mechanism 20 is housed in the second casing 42 through the opening, and this opening of the second casing 42 is closed by the compression mechanism cover 44.

The second casing 42 includes a cylindrical portion 42a and the bottom wall 42b formed at one end of the cylindrical portion 42a. The compression mechanism 20 is housed in a space defined by the cylindrical portion 42a and the bottom wall 42b. The bottom wall 42b divides the internal space of the first casing 41 from the internal space of the second casing 42. At the radially central portion of the bottom wall 42b, there is formed a through hole for allowing the other end of the rotating shaft 2a of the electric motor 10 to be inserted therethrough. In addition, a fitting portion for allowing a bearing 45 to be fitted thereto is formed on the bottom wall 42b. The bearing 45 supports the rotating shaft 2a at its other end.

Moreover, though not shown, a suction port and a discharge port for the refrigerant are formed in the casing 40. For example, the refrigerant suctioned from the suction port flows through the interior of the first casing 41, and is then suctioned into the second casing 42. Thereby, the suctioned refrigerant cools the electric motor 10.

The compression mechanism 20 is driven by the electric motor 10 to compress the refrigerant, and housed in the second casing 42 so as to be disposed near the other end of the rotating shaft 2a of a rotor 2.

In this embodiment, the compression mechanism 20 is a scroll compressor, and includes a fixed scroll 21 and a movable scroll 22. The refrigerant is compressed when the movable scroll 22 is driven to orbit with respect to the fixed scroll 21. After being compressed by the compression mechanism 20, the refrigerant is discharged from the discharge port.

As shown in FIG. 1, the electric motor 10 includes the rotor 2, the stator 3, bobbins 4 and coils 5. The rotor 2 has a plurality of magnetic poles (not shown). The stator 3 has an annular shape and is disposed radially outside the rotor 2. The bobbins 4, which provide electric insulation, are disposed at ends of the stator 3. The coils 5 are wound around the bobbins 4 and the stator 3. For example, the electric motor 10 may be a three-phase alternate-current motor, and the inverter 30 converts a direct current supplied by a vehicle battery (not shown) to an alternating current, and supplies the alternating current to the electric motor 10.

In this embodiment, four north-pole permanent magnets and four south-pole permanent magnets are embedded in the rotor 2, which thus has eight magnetic poles arranged at even intervals.

Also, in this embodiment, the stator 3 has twelve teeth 3b and twelve slots 3c alternately disposed at even intervals, as shown in FIG. 2.

Hereinafter, with reference to FIG. 7, there will be described an analysis result of the shape of the stator 3 that is deformed by an electromagnetic force applied to the stator 3 in the 8-pole (magnetic poles) 12-slot electric motor 10 according to this embodiment. Note that FIG. 7 shows a deformed shape of the stator 3 at a certain moment, and the amount of the deformation of FIG. 7 is greater than it really is (exaggerated) so as to make the deformation more distinctly seen.

Figure 7:
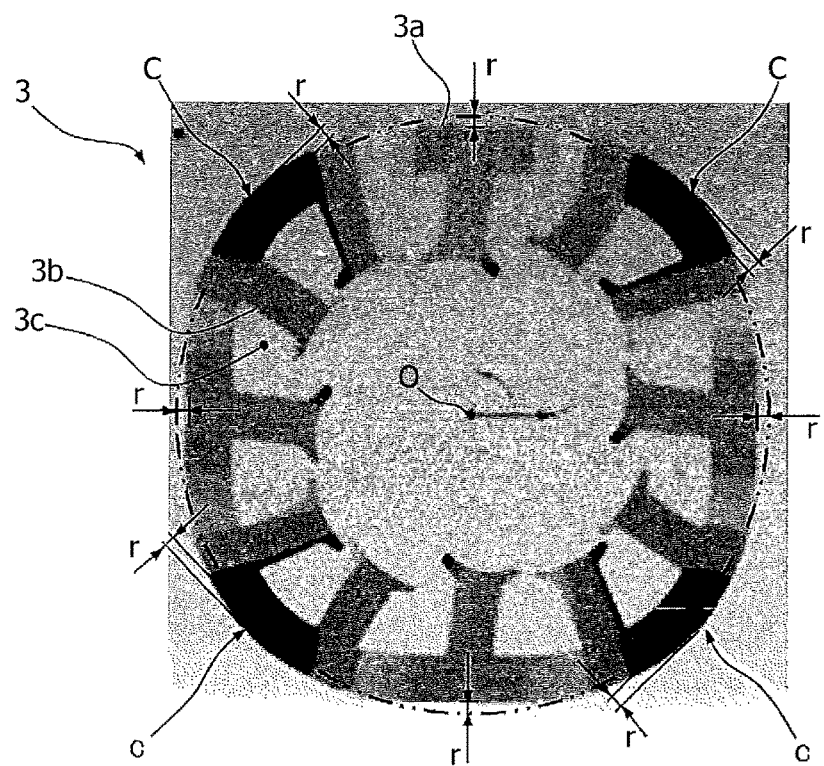
FIG. 7 is a conceptual diagram illustrating a deformed shape of the stator having twelve slots in the electric compressor according to the embodiment.

As indicated by two-dot chain line of FIG. 7, the stator 3 has a circular outer shape when no electromagnetic force is applied to it. FIG. 7 also shows that the stator 3 is deformed to have a quasi-square outer shape when an electromagnetic force is applied to it. Though not shown, the stator 3 is deformed to have a quasi-square outer shape also at another moment during the electromagnetic force application. However, four corner portions C of the quasi-square move around the rotation axis O of the rotor 2 in synchronization with each other in accordance with the phase and the like of the electric current. The stator 3 vibrates at a vibration amplitude r which changes in accordance with factors such as the material of the stator 3 and the magnitude of the electromagnetic force.

Next, there will be briefly described a vibration transmission suppression effect of the electric compressor 1 according to this embodiment.

When the inverter 30 supplies an alternating current to the electric motor 10, an electromagnetic force is applied to the stator 3. This deforms the stator 3 to have a quasi-square outer shape as shown in FIG. 7, and causes the stator 3 to vibrate in the radial direction with the amplitude r at every outer peripheral point. Such vibrations are transmitted through the protrusions 41f to the first casing 41, and then transmitted to fixing portions by way of which the first casing 41 is fixed to a vehicle after losing its vibration energy by vibrating thin portions of the peripheral wall 41a. Here, the vibration energy generated by the vibration of the stator 3 is sufficiently reduced through this vibration transmission process. Accordingly, when reaching the vehicle after being transmitted through the fixing portions, the vibration energy is sufficiently reduced.

In the three-point shrink-fitted electric compressor 1 according to this embodiment, only one of the four corner portions C overlaps any one of the three protrusions 41f at a certain moment. At that moment, the remaining three of the corner portions C face any of air gaps 46 (see FIG. 1) in contact with nothing but the air, and thus do not vibrate the first casing 41. This makes it possible to suppress the transmission rate, to the casing 40, of the vibration generated in the stator 3. As a result, the 8-pole 12-slot three-point shrink-fitted electric compressor 1 can reduce vibration transmission, and can also suppress radiated sounds due to the vibration of the casing 40.

On the other hand, when the number of the shrink-fitted portions is minimized to three in order to reduce vibration transmission as described above, each shrink-fitted portion has to provide an increased force for holding the stator 3 as compared to when the number of the shrink-fitted portions is four or more. However, increasing the allowance for shrink fitting (difference between the diameter of the inner circle extending along the protruding end surfaces 41f1 and the outside diameter of the stator 3 at each shrink-fitted portion under the condition where the stator 3 is not housed in the first casing 41) might result in the following: When a lower temperature increases the size of the allowance for shrink fitting, too much stress is applied to shrink-fitted components, in particular to the casing 40 (the first casing 41), which are thus reduced in durability.

To avoid such a situation, in this embodiment, each protrusion 41f is provided with the groove 41f2 which extends from the one end toward the other end in the axial direction along the circumferentially central portion of the protrusion 41f.

Figure 8:
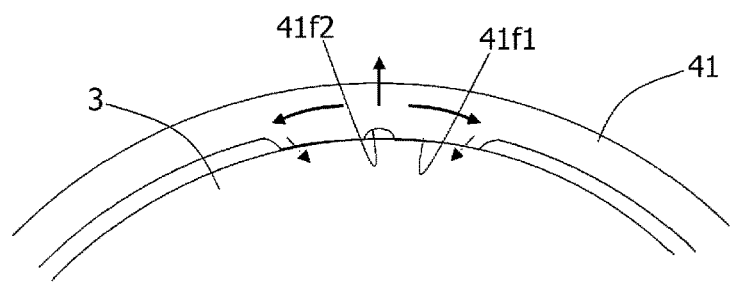
FIG. 8 is a cross-sectional view showing forces acting on shrink-fitted portions according to the embodiment.

Providing the groove 41f2 to each protrusion 41f as described above generates the forces as indicated by solid arrows of FIG. 8 in the protrusion 41f after the stator 3 is shrink-fitted. Specifically, a radially outward force is generated from the circumferentially central portion, in which the groove 41f2 is formed to decrease the thickness of the protrusion 41f, and circumferentially outward tensile forces are generated from the opposite sides of the groove 41f2. This causes a moment to occur in such a direction to bend the opposite circumferential edges of the protrusion 41f inward symmetrically with respect to the groove 41f2, as indicated by dotted arrows of FIG. 8. This moment increases the contact pressure between the outer periphery of the stator 3 and the opposite circumferential edges of each protruding end surface 41f1.

Figure 9:
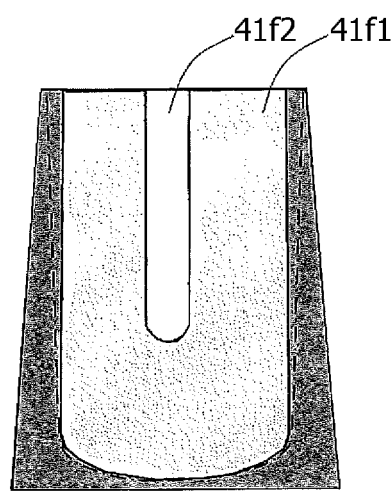
FIG. 9 shows how surface pressures are applied on the shrink-fitted portions.

FIG. 9 shows a surface pressure distribution of each protruding end surface 41f1 with the groove 41f2 formed. In FIG. 9, the darker area represents an effective surface pressure area, which has a surface pressure of a predetermined value or more high enough to be effective for holding the stator 3. Without any groove, the effective surface pressure area is formed outside dashed-dotted line of FIG. 9 in the protruding end surface. However, it has been proved that providing the groove 41f2 can increase the effective surface pressure area. In particular, it has been proved that such an increase in the effective surface pressure area is noticeable in the opposite side edges of the protruding end surface 41f1 at the one end where the groove 41f2 is opened.

At the other end (close to the compression mechanism 20) of the protruding end surface 41f1 in the axial direction, a surface pressure of a predetermined value or more is ensured since no outward tensile force is applied to the side edges of the protruding end surface 41f1, and thus a force to inwardly deform the side edges acts on them.

As described above, providing each protrusion 41f with the groove 41f2 which extends from the one end toward the other end in the axial direction along the circumferentially central portion of the protrusion 41f makes it possible to increase the surface pressure at the shrink-fitted portion between the protruding end surface 41f1 and the outer periphery of the stator 3 without increasing the allowance for shrink fitting. This makes it possible to ensure the shrink-fitted components, in particular the first casing 41, to have a desirable force for holding the stator 3 while maintaining a desirable durability.

The surface pressure can be increased as necessary by changing the length of the groove 41f2 as appropriate. However, if, for example, the groove is formed so as to extend throughout the protrusion from one end to the other end in the axial direction, the groove will divide the protrusion into two portions, and thus will not provide the effect as described above (effect of causing a moment in such a direction to bend the opposite circumferential edges of the protrusion inward symmetrically with respect to the groove).

On the other hand, if the groove is formed with both ends closed, the groove will be able to provide an effect similar to that provided by the groove 41f2 in which only one of the opposite ends is opened, to some extent or more. However, it is difficult to form such a groove by cored casting, and thus an additional cutting work is required.

Therefore, forming the groove 41f2 so as to be opened at the one end but closed at the other end, and thereby to make the contact area in the shrink-fitted portion to have a U shape, as in this embodiment, will provide greater functional and manufacturing advantages.

Moreover, in this embodiment, since the number of the shrink-fitted portions is reduced to three in the 8-pole (magnetic poles) 12-slot electric motor 10 in order to reduce vibration transmission from the stator 3 to the casing 40, the vibration transmission reduction effect can be desirably maintained. In addition, the present invention may be applied to a 6-pole (magnetic poles) 9-slot electric motor in which the number of the shrink-fitted portions is reduced to four.

Note that, irrespective of the numbers of the magnetic poles and the slots of the electric motor, the present invention can provide the effect of increasing the surface pressure in the shrink-fitted portions while suppressing an increase in the allowance for shrink fitting, and thereby ensuring the shrink-fitted components, such as the casing, to have a desirable force for holding the stator while maintaining a desirable durability.

Though a scroll compressor is used as the compression mechanism 20 in the electric compressor 1, the present invention is not limited to this. Instead, an appropriate type electric compressor such as a swash-plate compressor may be used as the compression mechanism 20.

Hereinabove, the preferred embodiments of the present invention have been described. However, the present invention is not limited to the embodiments described above, and various changes and modifications may be made based on the technical concept of the present invention.

REFERENCE SYMBOL LIST

1 electric compressor
2 rotor
3 stator
10 electric motor
20 compression mechanism
40 casing
41 first casing
41c fastening portion
41f protrusion
41f1 protruding end surface
41f2 groove

The invention claimed is:

1. An electric compressor which is driven by an electric motor and compresses refrigerant, and in which the electric motor including a rotor and a stator disposed radially outside the rotor is housed in a cylindrical casing, the electric compressor comprising
   a plurality of protrusions formed protruding radially inside from an inner periphery of the casing so as to be spaced apart from each other in a circumferential direction of the inner periphery, wherein
     each of the protrusions is provided with a groove which extends in an axial direction in a circumferentially central portion of the protrusion,
     the protruding end surfaces of the protrusions are fixed to an outer periphery of the stator by shrink fitting at contact interfaces therebetween,
     each of the grooves is opened at one end but closed at the other end in the axial direction in the corresponding one of the protrusions, and
     each of the contact interfaces is formed in a U shape.

2. The electric compressor according to claim 1, wherein
   the electric motor includes a rotor having eight magnetic poles, and a stator having twelve slots opening toward the rotor, and
   the number of the protrusions of the casing formed protruding so as to be spaced apart from each other in the circumferential direction is three.

3. The electric compressor according to claim 1, wherein
   the electric motor includes a rotor having six magnetic poles, and a stator having nine slots opening toward the rotor, and
   the number of the protrusions of the casing formed protruding so as to be spaced apart from each other in the circumferential direction is four.

* * * * *